Dec. 28, 1943.  K. P. NOWELL ET AL  2,337,678
ELECTRICAL CONDENSER MANUFACTURE
Filed Jan. 10, 1941
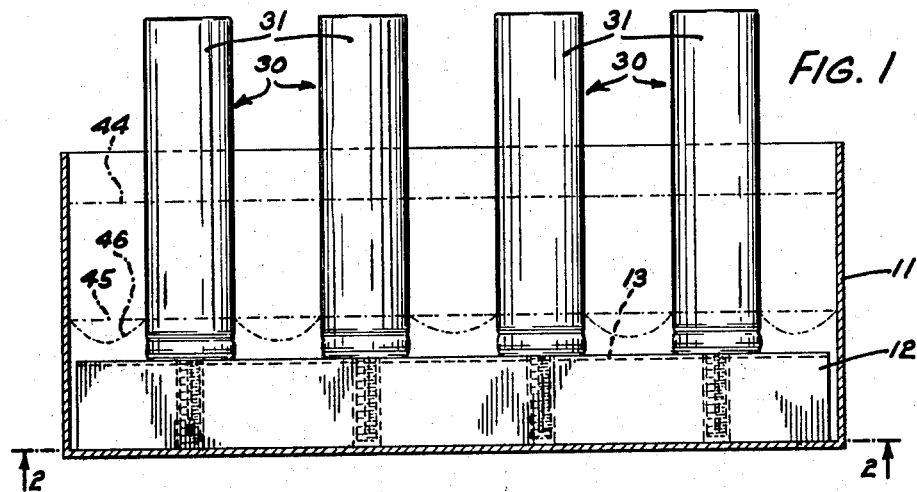
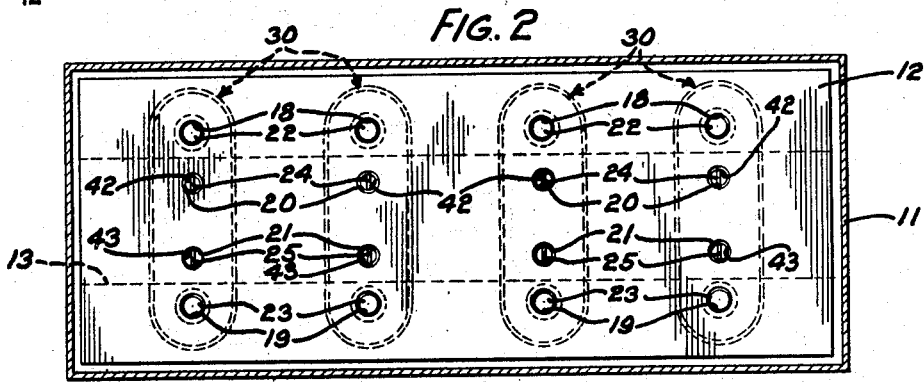
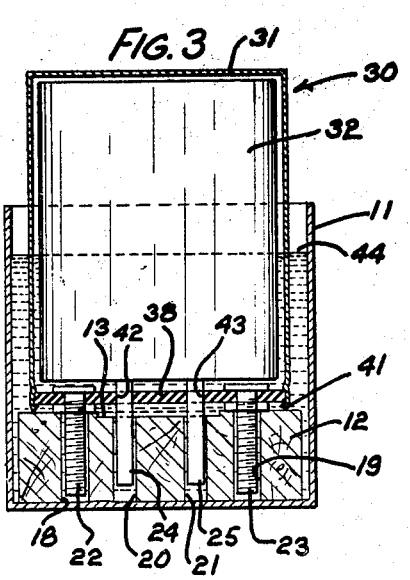
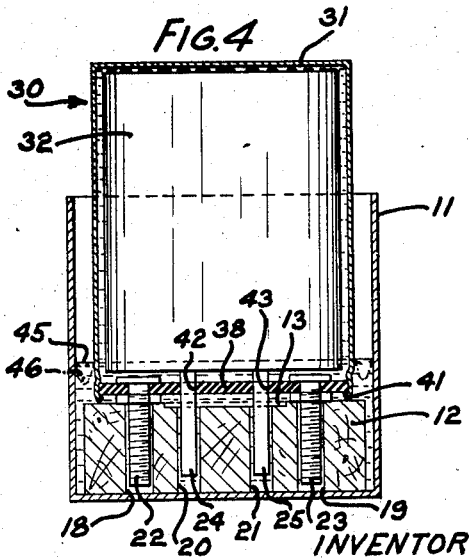
INVENTORS
K. P. NOWELL
A. F. RUS
BY Emery Robinson
ATTORNEY Patented Dec. 28, 1943

2,337,678

UNITED STATES PATENT OFFICE 2,337,678

ELECTRICAL CONDENSER MANUFACTURE

Keith P. Nowell, Hinsdale, and Albert F. Rus, Chicago, Ill., assignors to Western Electric Company, Incorporated, New York, N. Y., a corporation of New York Application January 10, 1941, Serial No. 373,946

13 Claims. (Cl. 226—1)

This invention relates to electrical condenser manufacture and more particularly to a method of filling condenser cans with sealing compound.

In the manufacture of electrical condensers of the wound or stack type, the condensers are formed of alternate layers of conducting and insulating material and are usually placed in containers to prevent damage to the structure of the condenser proper. In order to prevent atmospheric conditions from affecting the condensers, it has been common practice, for many years, to fill the interstices between the container and the body of the condenser, as well as any voids in the condenser, with sealing compounds of various types. Various types of sealing compounds have been used, substantially all of which are solid at ordinary room temperature or the temperatures at which the condensers are expected to operate. These compositions have heretofore been applied to the condenser to seal it in the can in various ways, usually by pouring the molten sealing compound into the can either before or after the condenser has been positioned therein. This mode of sealing the condensers in the cans to protect them from the moisture in the air has not proven satisfactory in all cases since the sealing compound, in hardening, shrinks an appreciable amount and it is necessary to repeatedly pour small quantities of the sealing compound into the container to fill the can.

It is an object of the present invention to facilitate and expedite the manufacture of condensers and more particularly to simplify the process of sealing condensers.

In accordance with one embodiment of the invention as applied to wound condensers comprising alternate layers of foil and insulating material and having terminal members attached to the layers of foil and extending outwardly therefrom, the condensers are placed in a suitable container or condenser can with the terminals extending outwardly from the can. A cap of insulating material is mounted in the end of the condenser, which insulator has apertures therein through which the terminals extend, and is provided with suitable mounting lugs fixed to the insulating member whereby the condenser, after it is completed, may be mounted in a supporting framework. Condensers so formed are placed in an inverted position on a block having apertures therein which conform to, but do not closely engage, the supporting members and terminals. This block is then positioned in a large container and the large container is then placed in a suitable evacuating chamber, wherein the condensers are subjected to heat and vacuum to remove moisture therefrom. While the container is still in the evacuating chamber, and while the vacuum is still applied thereto, the molten sealing compound is admitted to the large container and thereupon the vacuum is broken and the large container is removed from the evacuating chamber. The condenser cans which have been completely evacuated will, due to the difference in pressure inside and outside the can, be filled with the sealing compound. As the condensers cool, the shrinkage of the sealing compound inside the condenser cans will cause the sealing compound to be drawn up into the cans and the cans may then be removed from the supporting block after they have cooled to room temperature.

A better understanding of the method covered by the present invention will be had by reference to the accompanying drawing, wherein Fig. 1 shows a series of condensers positioned upon a suitable block in a container, the container being shown in section;

Fig. 2 is a sectional view, looking upwardly at the bottom of the supporting block, and is taken along the line 2—2 of Fig. 1 in the direction of the arrows;

Fig. 3 is a transverse sectional view taken through the large container and showing the position of the condenser within its can just prior to the removal of the large container from the evacuating chamber; and Fig. 4 is a sectional view similar to Fig. 3 showing the large container and condenser in section after the large container has been removed from the evacuating chamber.

Referring to the drawing, wherein like reference characters designate the same parts throughout the several views, particular reference being had to Fig. 1, there is shown a large container 11, which may be of any suitable shape and composition, in which there is positioned a block 12 of any suitable material, such as wood. The block 12 has a series of apertures 18, 19, 20 and 21 formed in it for receiving the mounting lugs 22 and 23 and the terminals 24 and 25 of a series of condensers, designated generally by the numeral 30. The block 12 should be slightly thicker than the length of the extending lugs 22 and 23 or terminals 24 and 25. The condensers 30 comprise an air tight condenser can 31 and a condenser unit 32 composed of alternate layers of metallic foil and insulating material positioned in the can 31. The layers of foil (not shown) of the condenser have the terminals 24 and 25 attached thereto and these terminals extend through an insulator plate 38, which may be held in the condenser can in any suitable manner, for example, by crimping the edge of the condenser can, as shown at 41. The insulator plate 38 has the pair of mounting lugs 22 and 23 suitably secured to it whereby the condenser may be mounted in any framework to which it is desired to attach the condenser. The insulator plate 38 has apertures 42 and 43 for receiving the terminals 24 and 25 of the condenser and it will be noted that these apertures are slightly larger than the terminals of the condenser so that sealing compound may pass through these apertures and enter the condenser can to seal the condenser from atmospheric influence. As shown in Fig. 1, there are a series of dot and dash lines, as indicated at 44, 45 and 46. These lines indicate the various levels of the sealing compound during the process of filling the condenser cans with compound.

In the method covered by the present application, the condensers 30 are positioned on the block 12, as shown in Figs. 1, 3 and 4, and the large container 11 is then placed in an evacuating chamber, where the condensers are subjected to heat and vacuum to remove the greatest possible amount of moisture from the condenser cans. The block 12 has a portion cut away, as shown at 13, so that part of the edges of the open end of the can 31 will be spaced from the block 12. After the condensers have been suitably dried in this manner and before the vacuum is released, a supply of molten sealing compound is admitted to the large container or tank 11. The amount of compound placed in the tank should be sufficient to fill completely the voids between various layers of material in the condenser, and the spaces between the wound condenser and the condenser can 31. Enough extra compound should be admitted to the large container 11 to insure that even after all of the voids in the can have been filled, the compound remaining in the container 11 will extend above the lower, open ends of the condenser cans positioned on the block 12. After the compound has been admitted to the container or tank 11 and, before the vacuum is released, the compound will approximately reach the level indicated by the line designated 44, Fig. 1.

As soon as the compound has been placed in the container 11, the vacuum may be broken and the entire container with the condensers 30 and compound in it may be transferred to any suitable place where the container may stand until cooled to normal room temperature. When the container is removed from the vacuum chamber to ordinary atmospheric pressure, the difference in pressure on the inside and outside of the condenser cans 31 will cause the compound to be drawn up into the cans 31 to fill all of the voids therein, the cut away portion 13 of the block 12 permitting the compound to flow into the cans 31. This will cause the level of the compound in the container 11 to fall to approximately the level indicated by the line designated 45.

The relatively large body of compound in the bottom of the container 11 will cool relatively slowly, whereas the relatively smaller body of the exposed portions of each condenser, being more exposed to the air, will cool relatively fast. Therefore, any shrinkage of the compound in the condenser cans 31 during cooling thereof will draw molten compound from the large supply in the container 11 up into the cans 31. This process will continue until the entire body of compound has cooled to ordinary room temperature and the compound in the container 11 will, upon shrinkage of the compound in the cans 31, assume substantially the configuration indicated by the line designated 46 as the compound in the cans 31 and in the container 11 solidifies. As soon as the entire body of compound is cooled to room temperature, and, as a result, solidifies, the filled condenser cans with the condensers in them may be broken out of the compound manually and, in breaking them out of the compound, the configuration of the block 12 will cause substantially all of the compound to be stripped from the terminals and mounting lugs 24, 25, 22 and 23, respectively, so that after the mounting lugs, terminals and cans are cleaned to remove the little compound left on them, the condensers will be ready for use.

Although a specific embodiment of the invention has been described herein as applied to a particular form of condenser, it will be understood that the invention is to be limited only by the scope of the appended claims.

What is claimed is:

1. The method of sealing condensers in condenser cans which comprises placing the condenser cans with the condensers in them in an inverted position in a container, subjecting the condensers while in the cans to vacuum, admitting a normally solid sealing compound in a liquid state to the container without releasing the vacuum, and restoring the container with the condensers, cans and sealing compound in it to atmospheric pressure to fill the interstices in the cans with compound by the pressure difference between the inside and outside of the can.

2. The method of sealing condensers in condenser cans, which comprises placing the condenser cans with the condensers in them in an inverted position in a container, subjecting the condensers and cans to heat and vacuum, admitting a normally solid sealing compound to the container in a molten state without releasing the vacuum, and restoring the container with the condensers and sealing compound in it to atmospheric pressure to force the compound into the cans as the compound solidifies.

3. The method of sealing condensers in condenser cans, which comprises placing the condenser cans with the condensers in them in an inverted position in a container, reducing the pressure of the atmosphere surrounding the condensers in the cans, admitting sealing compound in a liquid condition to the container without appreciably varying the pressure of the surrounding atmosphere, and then subjecting the atmosphere in which the condensers and cans are positioned to a substantially higher pressure while maintaining the normal upper open ends of the cans, here the lower ends of the cans, under the top surface of the sealing compound whereby the difference in pressure between the inside and outside of the can will force the compound into all the interstices in the can.

4. The method of sealing condensers in condenser cans, which comprises placing the condenser cans with the condensers in them in an inverted position in a container, reducing the pressure of the atmosphere surrounding the condensers and cans to a less than normal pressure, admitting sealing compound to the container while maintaining approximately the same less than normal atmospheric pressure around the condensers, and restoring the pressure of the atmosphere around the condensers to normal pressure while maintaining the open end of the can beneath the upper level of the sealing compound whereby the difference in pressure between the inside and outside of the can will force the compound into the can.

5. The method of sealing condensers in condenser cans which comprises placing air tight condenser cans having one end open with the condensers in them in an inverted position in a container with the open ends of the cans extending downwardly, subjecting the condensers while in the cans and in an inverted position to heat and vacuum, admitting sealing compound in a liquid state to the container without releasing the vacuum, restoring the container with the condensers and sealing compound in it to atmospheric pressure, and allowing the condensers to remain inverted in the compound until cool with the open end of the can beneath the level of the compound whereby voids which would be caused by shrinkage of the compound during cooling will be filled with the compound due to the difference in pressure between the inside and outside air-tight can.

6. The method of filling condenser cans having condensers therein with a sealing compound which comprises subjecting the condenser cans to heat and vacuum while held in an inverted position, immersing the lower open ends of the condenser cans in a bath of molten sealing compound without releasing the vacuum, then releasing the vacuum and allowing the condenser cans with their open ends immersed in the compound to remain in that position until cooled whereby the difference in pressure between the inside and outside of the can will cause the compound to be drawn into the cans as the compound cools and shrinks.

7. The method of filling condenser cans having condensers therein with a sealing compound which comprises subjecting the condensers in the condenser cans to heat and vacuum, immersing the lower open ends of the condenser cans in a bath of molten sealing compound without releasing the vacuum, and then transferring the condensers while still in the molten compound to atmospheric pressure whereby the difference in pressure within the condenser cans and without the condenser cans will result in the filling of the spaces in the condenser can with sealing compound.

8. The method of filling condenser cans having condensers therein with a sealing compound which shrinks as it solidifies, which comprises heating the atmosphere surrounding the condensers and reducing the pressure of said atmosphere while maintaining the condensers in the cans with the open ends of the cans downward, immersing the open ends of the cans in a bath of molten sealing compound, then increasing the pressure of the atmosphere surrounding the condensers and permitting the condensers to stand in said compound until the compound solidifies to force the compound into shrinkage voids in the cans by the difference in pressure inside and outside the cans.

9. The method of filling condenser cans with sealing compound which comprises placing the condensers in the cans with their terminals extending from the cans, placing the condensers with their terminals and open ends extending downwardly in a container, supporting the condenser cans in the container with the terminals spaced from the bottom of the container, subjecting the condensers in this condition to heat and vacuum, admitting molten sealing compound to the container and thereafter releasing the vacuum and permitting the condensers to cool without removing them from the container.

10. The method of filling condenser cans with sealing compound which comprises placing the condensers in the cans with their terminals extending from the cans, placing the condensers with their terminals and open ends extending downwardly in a container, filling a substantial portion of the container with a layer of filling material, supporting the condensers on said layer of filling material, subjecting the before described assemblage to vacuum, admitting molten sealing compound to the container, and thereafter releasing the vacuum and permitting the condensers to cool without removing them from the container whereby the difference in pressure between the inside and outside of the cans will force the sealing compound into the cans as the compound shrinks during solidification thereof, said step of filling a substantial portion of the container with a layer of filling material serving to expedite the cooling and resultant solidification of the compound.

11. The method of filling condenser cans with sealing compound which comprises placing the condensers in the cans with their terminals extending from the cans, placing the condensers with their terminals and open ends extending downwardly in a container, filling a substantial portion of the container with a mass of substantially heat insulating material for supporting the condensers on said mass of substantially heat insulating material, subjecting the before described assemblage to vacuum, admitting molten sealing compound to the container, and thereafter releasing the vacuum and permitting the condensers to cool without removing them from the container.

12. The method of filling condenser cans with sealing compound which comprises placing the condensers in the cans with their terminals extending from the cans, placing the condensers with their terminals extending from the open ends of the cans and extending downwardly in a container, filling a substantial portion of the container with wood for displaying a predetermined amount of compound and for supporting the condensers, subjecting the before described assemblage to vacuum, admitting molten sealing compound to the container, and thereafter releasing the vacuum and permitting the condensers to cool without removing them from the container whereby the difference in pressure between the inside and outside of the cans will cause the compound to be drawn into the cans as the compound in the cans shrinks while cooling.

13. The method of filling condenser cans with a normally solid sealing compound which comprises placing the condensers in the cans with their terminals extending from the cans, placing the condensers with their terminals and the open ends of the cans extending downwardly in a container, filling the container with a heat insulating media to a depth equal to slightly more than the length of the terminals of the condenser and in all the area except that closely adjacent the terminals, subjecting the condensers in this condition to heat and vacuum, admitting molten sealing compound to the container, thereafter releasing the vacuum and permitting the condensers to cool without removing them from the container, and stripping the cans and terminals from the solidified compound, said heat insulating media serving to displace a predetermined amount of compound in the container and thereby serving to expedite the cooling and solidification of the compound in the cans and the difference in pressure between the inside and outside of the can, after the vacuum is released, serving to force the compound into the cans as the compound therein solidifies and shrinks.

KEITH P. NOWELL.
ALBERT F. RUS.